(12) United States Patent
Kraeling et al.

(10) Patent No.: US 8,620,553 B2
(45) Date of Patent: Dec. 31, 2013

(54) SYSTEM AND METHOD FOR ESTABLISHING A NETWORK ACROSS A LOCOMOTIVE CONSIST OR OTHER VEHICLE CONSIST

(75) Inventors: Mark Bradshaw Kraeling, Melbourne, FL (US); Jared Cooper, Melbourne, FL (US); Todd Goodermuth, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/489,738

(22) Filed: Jun. 6, 2012

(65) Prior Publication Data

US 2012/0316707 A1    Dec. 13, 2012

Related U.S. Application Data

(60) Provisional application No. 61/495,572, filed on Jun. 10, 2011.

(51) Int. Cl.
*G01G 1/00*    (2006.01)

(52) U.S. Cl.
USPC ............................................. 701/70; 701/117

(58) Field of Classification Search
USPC .................................................. 701/70, 117
See application file for complete search history.

(56) References Cited

U.S. PATENT DOCUMENTS

2001/0044695 A1    11/2001    Doner

FOREIGN PATENT DOCUMENTS

| EP | 0829415 A1 | 3/1998 |
| EP | 1065128 A1 * | 1/2001 |
| WO | 0222425 A1 | 3/2002 |

OTHER PUBLICATIONS

Gralla et.al. "Initializing system for trains . . . ", EPO machine translation of EP1065128 A1, published Jan. 3, 2001.*
Search Report and Written Opinion from corresponding PCT Application No. PCT/US2012/041858 dated Nov. 30, 2012.

* cited by examiner

*Primary Examiner* — Mary Cheung
*Assistant Examiner* — Yuen Wong
(74) *Attorney, Agent, or Firm* — GE Global Patent Operation; John A. Kramer

(57) ABSTRACT

A method for establishing a network across a plurality of locomotives in a consist includes designating one locomotive of the plurality of locomotives as a network lead locomotive and designating the other of the plurality of locomotives as network trail locomotives.

20 Claims, 6 Drawing Sheets

SYSTEM AND METHOD FOR ESTABLISHING A NETWORK ACROSS A LOCOMOTIVE CONSIST OR OTHER VEHICLE CONSIST

CROSS REFERENCE TO RELATED APPLICATIONS

This application claims priority to U.S. provisional application Ser. No. 61/495,572 filed Jun. 10, 2011, hereby incorporated by reference in its entirety.

FIELD OF THE INVENTION

Embodiments of the invention relate generally to data communications. Other embodiments relate to network communications in a vehicle consist.

BACKGROUND OF THE INVENTION

A vehicle "consist" is a group of vehicles that are mechanically coupled to travel together along a route. For example, a train is a type of vehicle consist comprising a group of rail vehicles coupled together to travel along a track. Similarly, a locomotive consist is a group of two or more locomotives that are coupled together, as part of a larger train or otherwise. Trains may have one or more locomotive consists. Locomotives in a locomotive consist include a lead locomotive and one or more trail locomotives. A train may have a lead consist, and may also have one or more remote consists positioned further back in the train. Alternatively or additionally, some trains may have single locomotives positioned within the train and separated from other locomotives by one or more non-locomotive rail cars (e.g., cargo or passenger cars).

In a locomotive consist, each locomotive includes a connection at each end of the locomotive to couple the power and brake systems of the locomotive to adjacent locomotives such that they function together as a single unit. Each locomotive is connected to subsequent locomotives via a port and jumper cable that includes twenty seven pins on each end. This cable is commonly referred to in the industry as a multiple unit cable or "MU" cable. Two or more of the locomotives in a consist may each include an on-board controller or other electronics. In certain cases, it may be desirable to link the on-board electronics together as a computer network, such that electronics of the lead locomotive in the consist can communicate with electronics of the trail locomotives. This intra-consist network may allow for inherent redundancies in locomotive electronics to be used to improve reliability of locomotives by allowing lead locomotives to utilize electronic equipment contained in trail locomotives of the same consist. It may be easier and more cost effective to use remote electronics in a trail locomotive than providing redundant equipment on each locomotive.

Communications in a vehicle consist have been realized using a number of methods. A first involves wireless communications between the vehicles in the consist using radio equipment. A second method involves running dedicated network cables between the linked locomotives in a consist. A third method involves Ethernet over MU communications between the vehicles in the consist, utilizing an existing locomotive MU cable bus that interconnects the lead locomotive and the trail locomotives. The MU cable bus is an existing electrical bus that is used in the locomotive consist for transferring non-network control information between the lead locomotive and the trail locomotives. (MU "cable bus" refers to the MU cable jumper that actually interconnects adjacent locomotives and/or to the internal electrical system that connects the cable jumper to internal locomotive electronics and the MU ports on either end of a locomotive.)

Although systems exist for network communications in vehicle consists, existing systems may not provide reliable or efficient methods for establishing such communications. Accordingly, it may be desirable to have a vehicle consist communication system and/or method that differ in function from those systems that are currently available.

BRIEF DESCRIPTION OF THE INVENTION

An embodiment relates to a communication method for a consist comprising a plurality of vehicles. The method comprises linking the plurality of vehicles to establish a data network. For example, linking may include communicating over a communications path established between the vehicles, according to established protocols, in a manner that is designated for establishing the data network. The method further comprises designating a first vehicle of the plurality of vehicles as a network lead vehicle of the data network. "Network lead vehicle" means a vehicle in the consist that is primarily responsible for controlling operations of the data network in the consist. The method further comprises designating a second vehicle of the plurality of vehicles as a network trail vehicle of the data network. "Network trail vehicle" means a vehicle in the consist that is subordinate to the network lead vehicle in regards to one or more aspects of data network operation. The method further comprises communicating network data between the plurality of vehicles (e.g., to/from one vehicle to/from another vehicle or vehicles) based at least in part on the first vehicle designated as the network lead vehicle and the second vehicle designated as the network trail vehicle. Thus, for example, the network lead vehicle may be responsible for setting up and maintaining network routing tables for services and/or communications in the network, and the network trail vehicle may communicate according to the network routing tables set up and maintained by the network lead vehicle.

In an embodiment where the vehicles are rail vehicles in a rail vehicle consist, the method comprises linking the plurality of rail vehicles to establish a data network. The method further comprises designating a first rail vehicle of the plurality of rail vehicles as a network lead rail vehicle of the data network. As with network lead vehicles more generally, "network lead rail vehicle" (e.g., network lead locomotive) refers to a locomotive or other rail vehicle in the consist that is primarily responsible for controlling operations of the data network in the consist. The method further comprises designating a second rail vehicle of the plurality of rail vehicles as a network trail rail vehicle of the data network. "Network trail rail vehicle" (e.g., network trail locomotive) means a locomotive or other rail vehicle in the consist that is subordinate to the network lead rail vehicle in regards to one or more aspects of data network operation. The method further comprises communicating network data between the plurality of rail vehicles based at least in part on the first vehicle designated as the network lead vehicle and the second vehicle designated as the network trail vehicle. As indicated, the rail vehicles may be locomotives.

Another embodiment relates to a communication system (e.g., for a vehicle consist) comprising a first controller unit configured for operative coupling in a first rail vehicle. The first controller unit is configured, when the first rail vehicle is linked with one or more second rail vehicles in a data network of a consist, to designate one of the first rail vehicle or one of the one or more second rail vehicles as a network lead rail vehicle of the data network and to designate all other rail vehicles in the consist as network trail rail vehicles of the data network. The first controller unit is further configured to control communications of network data between the first rail vehicle and the one or more second rail vehicles based at least in part on the network lead rail vehicle and network trail rail vehicle designations. Again, the rail vehicles may be locomotives.

In another embodiment of a communication system, the communication system comprises a first controller unit configured for operative coupling in a first rail vehicle. The first controller unit is configured, when the first rail vehicle is linked with one or more second rail vehicles in a data network of a consist, to enter a first designated mode of operation responsive to communications between the first rail vehicle and the one or more second rail vehicles for selecting the first rail vehicle to operate in the first designated mode of operation and the one or more second rail vehicles to operate in a different, second designated mode of operation. The first controller unit is further configured, when in the first designated mode of operation, to at least one of: coordinate data traffic in the data network of the consist; and/or configure and manage services available to plural entities of the data network of the consist (entity referring to a device or other system or subsystem that utilizes and/or communicates network data). The rail vehicles may be locomotives.

Other embodiments of the present invention relate to a system and method for managing network services and devices among a plurality of locomotives in a consist. In one embodiment of the method, a first operational component of a first vehicle in the consist is monitored to determine an operational status of the first operational component, and the operational status of the component is maintained in a database.

In another embodiment, traffic or data is routed to a second operational component of a second vehicle in dependence upon the operational status of the first component, wherein the operational status of the first component is "non-operational."

Another embodiment relates to a system for managing network services among locomotives in a consist. The system comprises a first a first operational component positioned in a first locomotive in the consist, a second operational component positioned in a second locomotive in the consist, the first and second operational component being at least similar in function, a monitoring device configured for deployment on one of the locomotives in the consist and in communication with the first and second operational components, and further configured to determine an operational status of the first and second operational component, and a signal transmitting device in communication with the first and second operational components and configured to route traffic to one of the first operational component and the second operational component when the monitoring unit determines that the other of the first operational component and the second operational component is in a failure state.

In an embodiment, the system further includes a database on the lead locomotive for storing the operational status of the first operational component and the second operational component.

Other embodiments of the present invention relate to a system and method for managing a high-availability network for a locomotive consist. In one embodiment of the method, an availability status of a plurality of network channels across a plurality of locomotives in the consist is monitored. Messages are then routed through one or more of the network channels in dependence upon the monitored availability status of the network channels.

In an embodiment the availability status of the plurality of network channels is maintained in a database In another embodiment, the messages are split across at least two of the network channels and then re-ordered based on a time-stamp to maintain an order of the messages.

Another embodiment relates to a system for managing a high-availability network for a locomotive consist. The system comprises a first plurality of communication channels associated with a first locomotive and a second plurality of communication channels associated with a second locomotive. A routing unit in communication with the first and second plurality of communication channels is configured for routing a message through at least one of the first plurality of communication channels of the first locomotive and at least one of the second plurality of channels of the second locomotive in dependence upon an availability status of the first and second plurality of communication channels.

Yet other embodiments of the present invention relate to a system and method for resolving a conflict between IP addresses of locomotives in a consist. In one embodiment of the method, it is determined that a first locomotive in the consist has an IP address that is the same as an IP address of a second locomotive in the consist. An unused IP address is then identified and assigned to one of the first locomotive and the second locomotive.

Another embodiment relates to a system for resolving a conflict between IP addresses of locomotives in a consist. The system comprises a conflict determination module in communication with a first locomotive having a first IP address and a second locomotive having a second IP address, and configured to determine that the first IP address is the same as the second IP address, a controller configured for deployment on at least one of the first locomotive and the second locomotive and further configured for identifying an unused IP address, wherein the controller is capable of assigning the unused IP address to one of the first locomotive and the second locomotive. In another embodiment, the conflict determination module is the controller.

Any of the aforementioned embodiments are also applicable for communicating data in vehicle consists generally. "Vehicle consist" refers to a group of vehicles that are mechanically coupled or linked together to travel along a route.

In any of the embodiments set forth herein, data transmitted over the MU cable bus or other communication means may be used for locomotive or other vehicle control, such as controlling the locomotive or other vehicle for movement along a route. While this Ethernet over MU communications system may be utilized in connection with the embodiments of the invention discussed below, the embodiments are not limited to use with an Ethernet over MU system. In particular, the embodiments of the present invention discussed below may also be employed and utilized in connection with a wireless communications system such as one using radio equipment to facilitate communication between locomotives in the consist. In addition, the embodiments described below may also be used with a communication system that utilizes dedicated network cables between the linked locomotives in a consist.

BRIEF DESCRIPTION OF THE DRAWINGS

The present invention will be better understood from reading the following description of non-limiting embodiments, with reference to the attached drawings, wherein below.

DETAILED DESCRIPTION OF THE INVENTION

Figure 1:
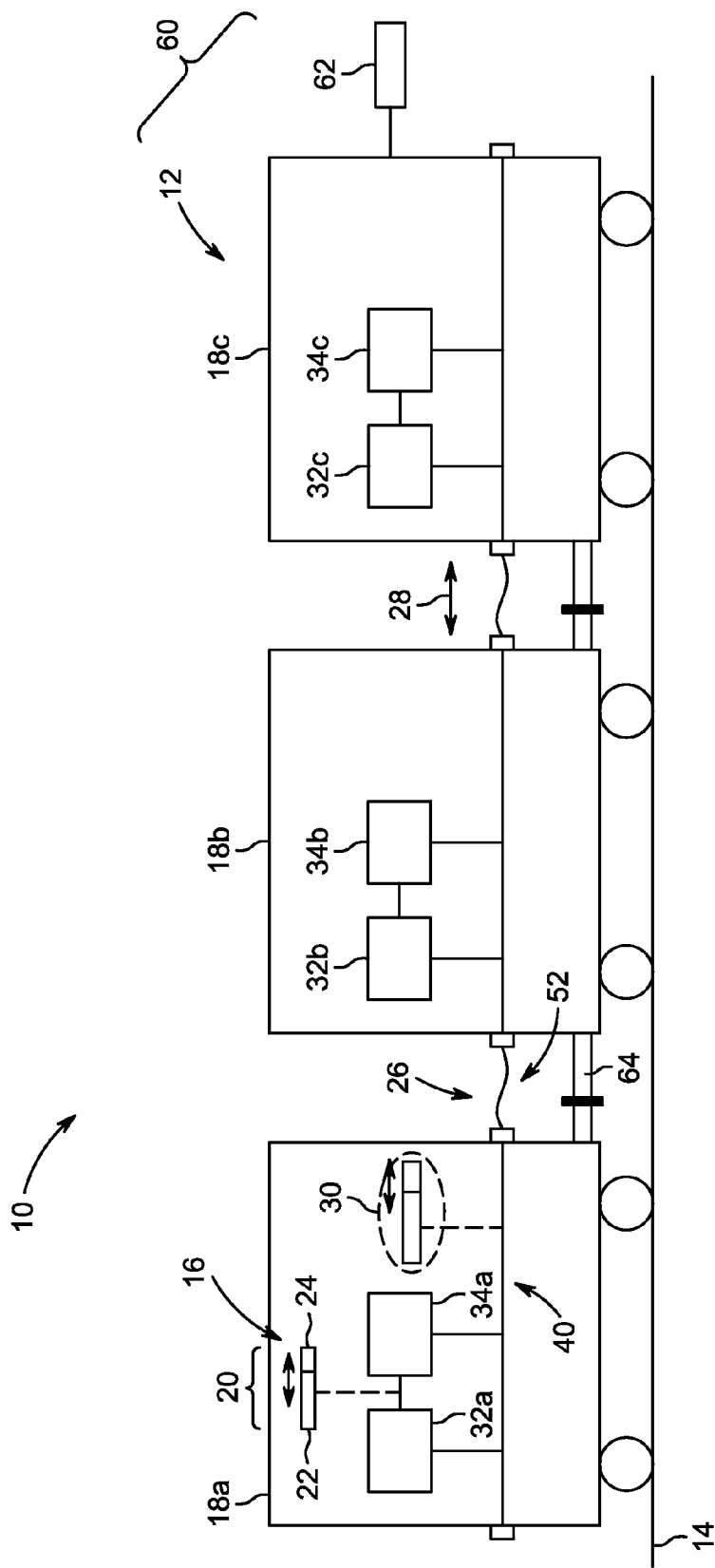
FIG. 1 is a schematic diagram of a communication system for communicating data in a locomotive consist, according to an embodiment of the present invention.

Embodiments of the invention relate to communication systems and methods for a vehicle consist comprising a plurality of vehicles. For example, according to one aspect, subsequent to the vehicles being linked in a data network, a first vehicle of the plurality of vehicles is designated as a network lead vehicle of the data network. As noted above, "network lead vehicle" means a vehicle in the consist that is primarily responsible for controlling operations of the data network in the consist, for example, "network lead rail vehicle" (e.g., network lead locomotive) refers to a locomotive or other rail vehicle in the consist that is primarily responsible for controlling operations of the data network in the consist. Further, a second vehicle of the plurality of vehicles is designated as a network trail vehicle of the data network. As also noted above, "network trail vehicle" means a vehicle in the consist that is subordinate to the network lead vehicle in regards to one or more aspects of data network operation, for example "network trail rail vehicle" (e.g., network trail locomotive) refers to a locomotive or other rail vehicle in the consist that is subordinate to the network lead rail vehicle in regards to one or more aspects of data network operation. Network data is communicated between the plurality of vehicles based at least in part on the first vehicle designated as the network lead vehicle and the second vehicle designated as the network trail vehicle. Thus, in the case of locomotives in a rail vehicle consist (for example), embodiments of the invention establish an operative communication network across the consist through which the locomotives may effectively communicate with one another, including managing services and devices deployed on locomotives across the consist.

Reference will be made below in detail to exemplary embodiments of the invention, examples of which are illustrated in the accompanying drawings. Wherever possible, the same reference numerals used throughout the drawings refer to the same or like parts. Although exemplary embodiments of the present invention are described with respect to trains, locomotives, and other rail vehicles, embodiments of the invention are also applicable for use with vehicles generally, such as off-highway vehicles, agricultural vehicles, and/or transportation vehicles, each of which may be included in a vehicle consist. As noted above, a vehicle consist (e.g., locomotive consist) is a group of vehicles (e.g., locomotives) that are mechanically coupled or linked together to travel along a route, with each vehicle in the consist being adjacent to one or more other vehicles in the consist.

With reference to FIG. 1, an exemplary communication system 10 for communicating data in a locomotive consist 12 is shown. The consist 12 may be configured to travel along a railway 14, for example. In the system 10, network data 16 is transmitted from one locomotive 18a in the consist 12 (e.g., a lead locomotive 18a) to one or more other locomotives 18b, 18c in the consist (e.g., a trail locomotive 18b and/or 18c). Each locomotive 18a-18c is adjacent to and mechanically coupled with another locomotive in the consist 12 such that all locomotives in the consist are connected (directly or indirectly by way of one or more non-locomotive rail vehicles). "Network data" 16 refers to data that is packaged in packet form, meaning a data packet that comprises a set of associated data bits 20, e.g., Ethernet-formatted data packets. (Each data packet may include a data field 22 and a network address or other address 24 uniquely or otherwise associated with a computer unit or other electronic component in the consist 12.) The network data 16 is transmitted over a locomotive multiple unit (MU) cable bus 26. The MU cable bus 26 is an existing electrical bus interconnecting the lead locomotive 18a and the trail locomotives 18b, 18c in the consist. The MU cable bus 26 is used in the locomotive consist 12 for transferring non-network control information 28 between locomotives in the consist. "Non-network" control information 28 refers to data or other information, used in the locomotive consist for control purposes, which is not packet data. In another aspect, non-network control information 28 is not packet data, and does not include recipient network addresses.

Figure 2:
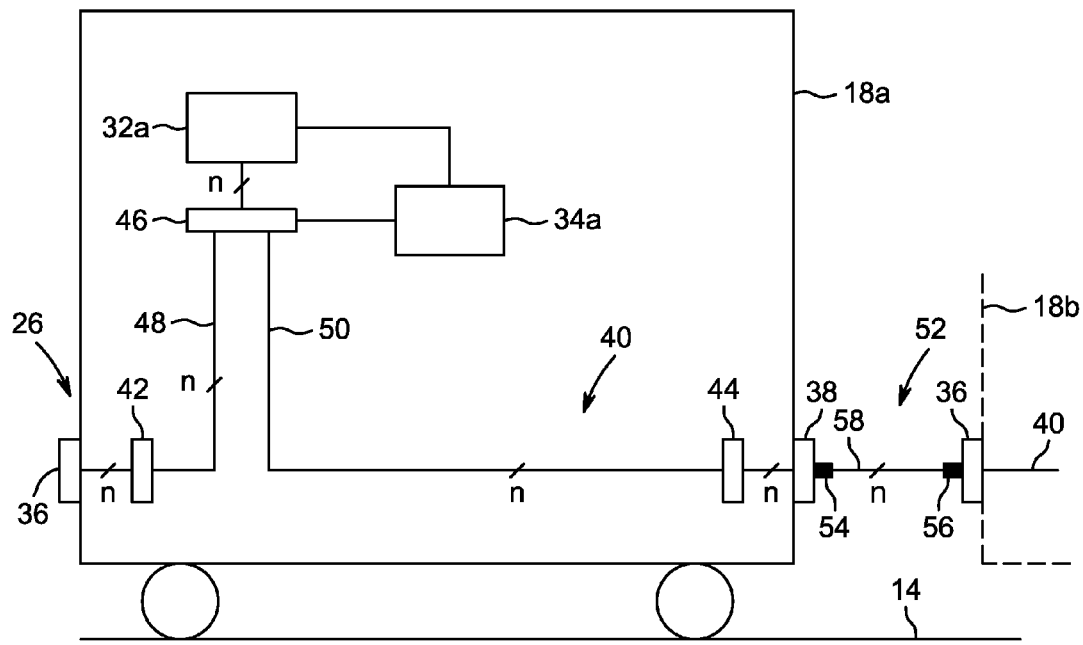
FIG. 2 is a schematic diagram of an MU cable bus in a locomotive, shown in the context of the communication system of FIG. 1.

One example of an MU cable bus 26 is shown in more detail in FIG. 2. Other configurations are possible, depending on the type of locomotive involved. The MU cable bus 26 is an existing electrical bus interconnecting the lead locomotive 18a and the trail locomotives 18b, 18c in the consist. In each locomotive, e.g., the lead locomotive 18a as shown in FIG. 2, the MU cable bus 26 comprises a front MU port 36, a rear MU port 38, and an internal MU electrical system 40 that connects the front port 36 and the rear port 38 to one or more operational/electronic components 32a of the locomotive 18a. In the illustrated example, the internal MU electrical system 40 comprises a front terminal board 42 electrically connected to the front MU port 36, a rear terminal board 44 electrically connected to the rear MU port 38, a central terminal board 46, and first and second electrical conduit portions 48, 50 electrically connecting the central terminal board 46 to the front terminal board 42 and the rear terminal board 44, respectively. The one or more electronic components 32a of the locomotive 18a may be electrically connected to the central terminal board 46, and thereby to the MU cable bus 26 generally. Although the front MU port 36 and rear MU port 38 may be located generally at the front and rear of the locomotive 18a, this is not always the case, and designations such as "front," "rear," "central," etc. are not meant to be limiting but are instead provided for identification purposes.

Figure 3:
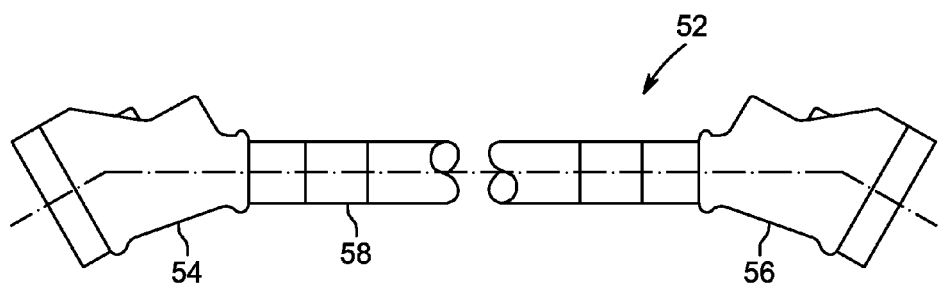
FIG. 3 is a schematic diagram of an MU cable jumper.

As shown in FIGS. 2 and 3, the MU cable bus 26 further comprises an MU cable jumper 52. The jumper 52 comprises first and second plug ends 54, 56 and a flexible cable portion 58 electrically and mechanically connecting the plug ends together. The plug ends 54, 56 fit into the MU ports 36, 38. The MU cable jumper 52 may be electrically symmetrical, meaning either plug end can be attached to either port. The MU cable jumper 52 is used to electrically interconnect the internal MU electrical systems 40 of adjacent locomotives, e.g., locomotive 18a and locomotive 18b. As such, for each adjacent pair of locomotives 18a, 18b, one plug end 54 of an MU cable jumper 52 is attached to the rear MU port 28 of the front locomotive 18a, and the other plug end 56 of the MU cable jumper 52 is attached to the front MU port 36 of the rear locomotive 18b. The flexible cable portion 58 of the MU cable jumper 52 extends between the two plug ends, providing a flexible but secure electrical connection between the two locomotives 18a, 18b.

Depending on the particular type and configuration of locomotives, the electrical conduit portions 48, 50 and MU cable jumpers 52 may be configured in different manners, in terms of the number "n" ("n" is a real whole number equal to or greater than 1) and type of discreet electrical pathways included in the conduit or jumper. In one example, each conduit portion 48, 50 and the jumper cable portion 58 comprises a plurality of discreet electrical wires, such as 12-14 gauge copper wires. In another example, the cable portion 58 (of the MU cable jumper 52) comprises a plurality of discreet electrical wires, while the conduit portions 48, 50 each include one or more discreet electrical wires and/or non-wire electrical pathways, such as conductive structural components of the locomotive, pathways through or including electrical or electronic components, circuit board traces, or the like. Although certain elements in FIG. 2 are shown as including "n" discreet electrical pathways, it should be appreciated that the number of discreet pathways in each element may be different, i.e., "n" may be the same or different for each element.

As noted, the plug ends 54, 56 of the MU cable jumper 52 fit into the MU ports 36, 38. For this purpose, the plug ends and MU ports are complementary in shape to one another, both for mechanical and electrical attachment. The plug end 54, 56 may include a plurality of electrical pins, each of which fits into a corresponding electrical socket in an MU port. The number of pins and sockets may depend on the number of discreet electrical pathways extant in the internal electrical conduits 40, MU cable jumpers 52, etc. In one example, each plug end 54, 56 is a twenty seven-pin plug.

The central terminal board 46, front terminal board 42, and rear terminal board 44 each comprise an insulating base (attached to the locomotive) on which terminals for wires or cables have been mounted. This provides flexibility in terms of connecting different electronic components to the MU cable bus.

The term "MU cable bus" refers to the entire MU cable bus or any portion(s) thereof, e.g., terminal boards, ports, jumper cable, conduit portions, and the like. As should be appreciated, when two locomotives are connected via an MU cable jumper 52, both the MU cable jumper 52 and the internal MU electrical systems 40 of the two locomotives together form the MU cable bus. As subsequent locomotives are attached using additional MU cable jumpers 52, those cable jumpers and the internal MU electrical systems 40 of the subsequent locomotives also become part of the MU cable bus.

As indicated in FIG. 1, the locomotive consist 12 may be part of a train 60 that includes the locomotive consist 12, a plurality of railcars 62, and possibly additional locomotives or locomotive consists (not shown). Each locomotive 18a-18c in the consist 12 is mechanically coupled to at least one other, adjacent locomotive in the consist 12, through a coupler 64. The railcars 62 are similarly mechanically coupled together and to the locomotive consist to form a series of linked vehicles. The non-network control information may be used for locomotive control purposes or for other control purposes in the train 60.

The communication system 10 may comprise respective router transceiver units 34a, 34b, 34c positioned in the lead locomotive 18a and each of the trail locomotives 18b, 18c in the locomotive consist 12. The router transceiver units 34a, 34b, 34c are each electrically coupled to the MU cable bus 26. The router transceiver units 34a, 34b, 34c are configured to transmit and/or receive network data 16 over the MU cable bus 26.

The communications system 10 shown in FIG. 1 is intended to be illustrative of a communications system that may be utilized in connection with the embodiments of the present invention disclosed below. While this Ethernet over MU communications system (that utilizes an existing locomotive multiple unit (MU) cable bus that interconnects the lead locomotive and the trail locomotives) may be utilized in connection with the embodiments of the invention discussed below, the embodiments are not limited to use with an Ethernet over MU system. In particular, the embodiments of the present invention discussed below may also be employed and utilized in connection with a wireless communications system such as one using radio equipment to facilitate communication between locomotives in the consist. In addition, the embodiments described below may also be used with a communication system that utilizes dedicated network cables between the linked locomotives in a consist.

Figure 4:
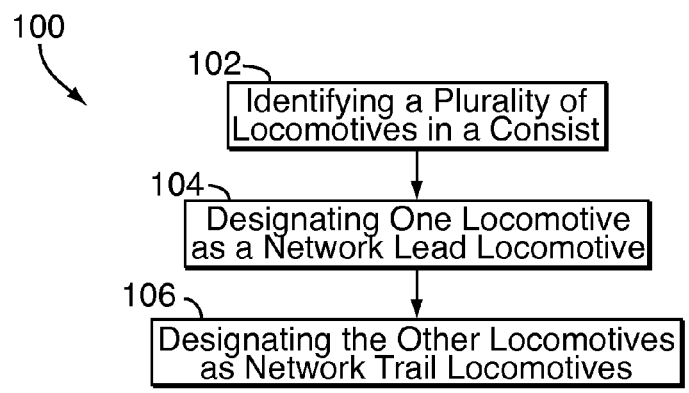
FIG. 4 is a flowchart illustrating an exemplary method for establishing a network across a plurality of locomotives in a consist, according to an embodiment of the present invention.

Embodiments of the present invention relate to a system and method for determining the network lead vehicle among a plurality of vehicles in a consist. In an embodiment, the vehicles may be locomotives, although the system and method may also be used in connection with other rail vehicles and non-rail vehicles. FIG. 4 illustrates an exemplary method 100 for establishing a network across a plurality of locomotives in a consist, according to one embodiment of the present invention.

In embodiments, a network lead locomotive is designated to configure all the services for a respective data network of the locomotives in the consist, and may be responsible for signal/traffic coordination for various devices on board each locomotive. In an embodiment, when a locomotive is by itself such that there are no other locomotives in communication with it in a train or other rail vehicle consist, the locomotive is designated as the network lead locomotive. As the network lead locomotive, the locomotive establishes a set of services and operations it is capable of performing and manages this "network" of a single locomotive. The set of services established and managed by the locomotive may include conventional operational components, for example, 220 MHz radio gear and components for communication purposes and GPS systems and components, as well as horns, lights and other indicators and systems utilized during operation of the consist.

In another embodiment, the consist may include more than one locomotive that is capable of functioning as the network lead locomotive. As shown in FIG. 4, the method first includes the step 102 of identifying a plurality of locomotives in the consist. In such an instance, the locomotives may be mechanically coupled and in communication with one another, such as being linked through a multiple unit cable. If there is more than one "lead" locomotive, however, such as if a single network lead locomotive has not been designated, then a network conflict may arise which could cause network traffic and packets to be missed because of a trail locomotive attempting to find a lead or a lead trying to find a trail.

Accordingly, in consists containing more than one locomotive that is capable as functioning as a network lead locomotive, it becomes necessary to then determine which of the locomotives in the consist will be designated, and serve as, the network lead locomotive of the data network for the consist, at step 104. In an embodiment, the network lead locomotive may be determined by one or more locomotive parameters or characteristics. In one embodiment, the parameter may be one or more positions of one or more of the locomotives in the consist. For example, the first locomotive in the consist may be designated the network lead locomotive of the data network based on its position at the head of the consist. After designating a network lead locomotive, the remaining locomotives or vehicles in the consist are designated network trail locomotives or vehicles, at step 106. In an embodiment, the steps of designating the network lead and trail locomotives may be carried out automatically subsequent to the locomotives being linked to establish the data network. In an embodiment, designating a locomotive as a network lead locomotive includes configuring the locomotive for operations as the network lead locomotive and communicating status information indicative of its designation as network lead to the other locomotives in the consist, and configuring the other locomotives in the consist as network trail locomotives.

In another embodiment, the lead network locomotive may be designated based on a temporal sequence of addition to the consist. In particular, if a data network already exists and has a designated network lead locomotive, other locomotives that are subsequently added to the consist may automatically be designated as trail locomotives.

In yet another embodiment, the network lead locomotive may be designated based upon movement of the locomotives in the consist, such as a GPS or otherwise determined direction of movement of the consist. In particular, in an embodiment a locomotive may be designated as the network lead locomotive based on the locomotive being a leading locomotive of the consist in a designated direction of travel of the consist.

In other embodiments, the network lead locomotive may be designated after the consist begins moving based upon an algorithm. In this embodiment, GPS information (e.g., direction and speed), wheel speed information, locomotive engineer handle direction information and/or switch settings for lead/trail or headlight configuration may be utilized by the locomotives to determine and then designate lead and trail locomotives in the consist. In an embodiment, a wheel speed sensor may be utilized to detect and relay wheel speed to at least one operational component, such as a controller, on board at least one of the locomotives. The sensor may also be configured to sense a direction of the locomotive. With respect to engineer handle direction, i.e., handle position, in an embodiment, if the handle is in the forward position and the locomotive is travelling above a threshold speed, then the position of the locomotives from a GPS unit can determine the front, middle and rear of the consist. Given this information, an algorithm can then determine and designate a lead and trail locomotives.

In another embodiment, the locomotives within the consist, once linked to establish a data network, may communicate setup data to one another. One locomotive in the consist may then be designated as the network lead locomotive in the data network and other locomotives designated as network trail locomotives based on the setup data. Communication of the setup data may be carried out automatically subsequent to the locomotives being linked. In the event that another locomotive is subsequently added to the consist, setup data may be communicated between the added locomotive and a first locomotive in the consist (which may have been previously designated as network lead). Based upon the setup data, the added locomotive may be designated as an additional network trail locomotive. Alternatively, the added locomotive may be designated as the network lead locomotive in conjunction with designating the first locomotive as a now network trail locomotive of the data network.

Once the locomotives have been linked to establish a data network, and lead and trail locomotives of the data network have been designated, network data may be communicated between the locomotives based at least in part on the one locomotive designated as the network lead locomotive and one or more other locomotives designated as network trail locomotives, as discussed hereinafter. As alluded to above, designating a single locomotive to serve as the network lead locomotive is important from a controls perspective. In an embodiment, the designated network lead locomotive may configure services available to entities in the data network and coordinate data traffic in the data network. In particular, the network lead locomotive may store, create and update the master routing tables relating to services of the respective locomotives in the consist and is also capable of transitioning services from one locomotive to another, such as from the network lead locomotive to one of the trail locomotives. In addition, the network trail locomotives may request overall network information from the network lead locomotive.

Moreover, by knowing the network lead locomotive, network services can be managed across the consist and traffic may be sent to lead or trail vehicles in the consist. For example, in an embodiment, a device on the network lead locomotive may want to utilize a radio on a trail locomotive because the radio on the lead locomotive is broken or otherwise non-functional. By recognizing that the radio of the lead locomotive is non-functional, and that a trail locomotive has a functioning radio, the network lead locomotive can route radio traffic to the functioning radio on board the trail locomotive to maintain desired functionality. In addition, the lead locomotive may update the master routing tables such that all radio traffic is routed to the functioning radio, as opposed to the currently non-functioning radio on board the lead locomotive.

In an embodiment, the consist data network is established and the network lead locomotive is automatically designated through the communication of the locomotives, as discussed above. In particular, upon being placed in communication with one another, such as through a MU cable bus, dedicated network cables, through wireless communications, etc., the locomotives determine, according to a predetermined set of commands and in view of one or more locomotive parameters, as discussed above, which locomotive will be designated the network lead locomotive and which will then be designated trail locomotives.

Figure 5:
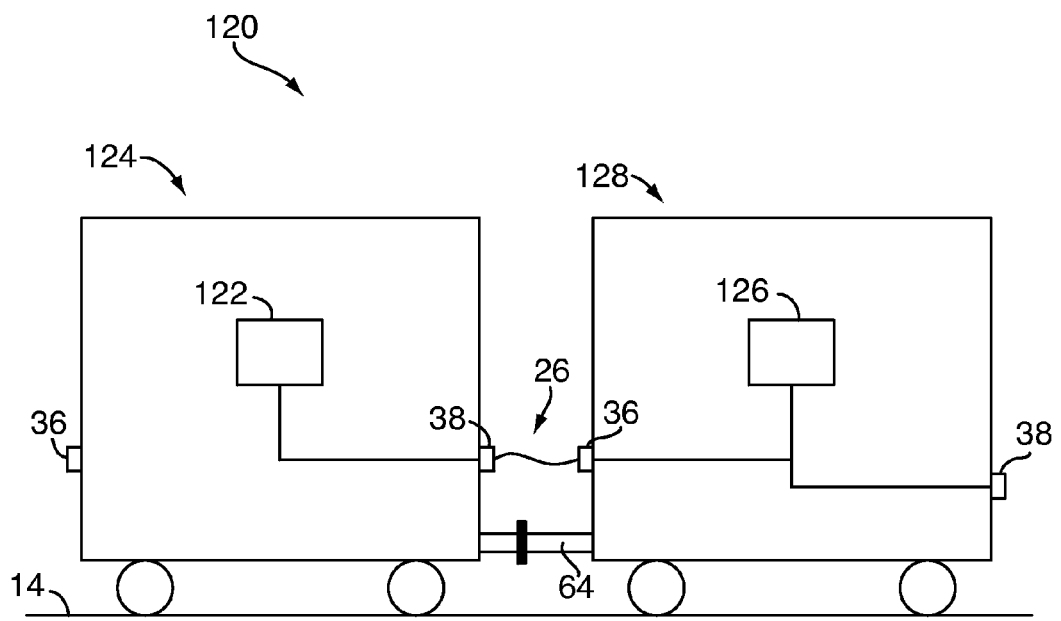
FIG. 5 is a schematic diagram of a system for establishing a network across a plurality of locomotives in a consist, according to an embodiment of the present invention.

FIG. 5 is a schematic diagram of a system 120 for establishing a network across a plurality of locomotives in a consist, according to an embodiment of the present invention. As shown therein, the system includes an electronic component such as a first controller unit 122 positioned in a first locomotive 124 in the consist, and a second electronic component such as a second controller 126 unit positioned in a second locomotive 128 in the consist and in communication with the first controller unit 122 in the first locomotive 124. The first locomotive 124 is adjacent to and mechanically coupled with the second locomotive 128 though a coupler 64, as discussed above. The first controller 122 and second controller 126 are configured to designate the network lead locomotive and network trail locomotive(s) according to at least one parameter of the locomotives in the consist, as discussed above.

In connection with this, the first controller 122 is configured to designate one of the locomotives in the data network of the consist as a network lead locomotive of the data network and to designate all other locomotives in the consist as network trail locomotives of the data network. Moreover, the first controller unit is further configured to control communications of network data between the lead locomotive and trail locomotives based at least in part on the network lead locomotive and network trail locomotive designations. In connection with designating network lead and trail locomotives based on at least one parameter of the locomotives, the at least one parameter may be one or more of a position of a first locomotive relative to one or more other locomotives in the consist, a sequence of locomotives added to the consist, or an identification of which locomotive in the consist is a leading locomotive of the consist in a designated direction of travel.

In another embodiment, the first controller unit 122 is configured to automatically control communication setup data between the first locomotive 124 and one or more second locomotives 128 subsequent to establishment of the data network in the consist. In addition, the first controller unit 122 may designate the network lead locomotive and trail locomotive(s) based at least in part on the setup data. In an embodiment, information of the parameter (e.g., sequence of the locomotives added to the consist, or the like) may be included in the setup data.

Once network lead and trail locomotives are designated (regardless of the exact manner in which such designations are effected) the first controller 122 is adapted to configure services available to entities in the data network and to coordinate data traffic in the data network.

Figure 6:
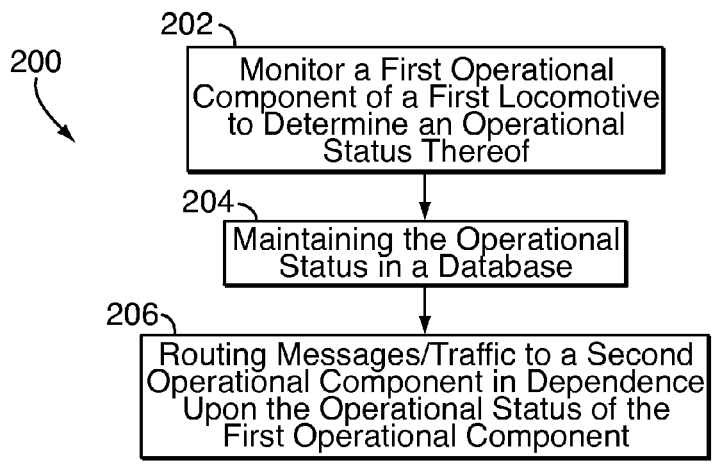
FIG. 6 is a flowchart illustrating an exemplary method for managing network services among a plurality of networked locomotives in a consist, according to an embodiment of the present invention.
Figure 7:
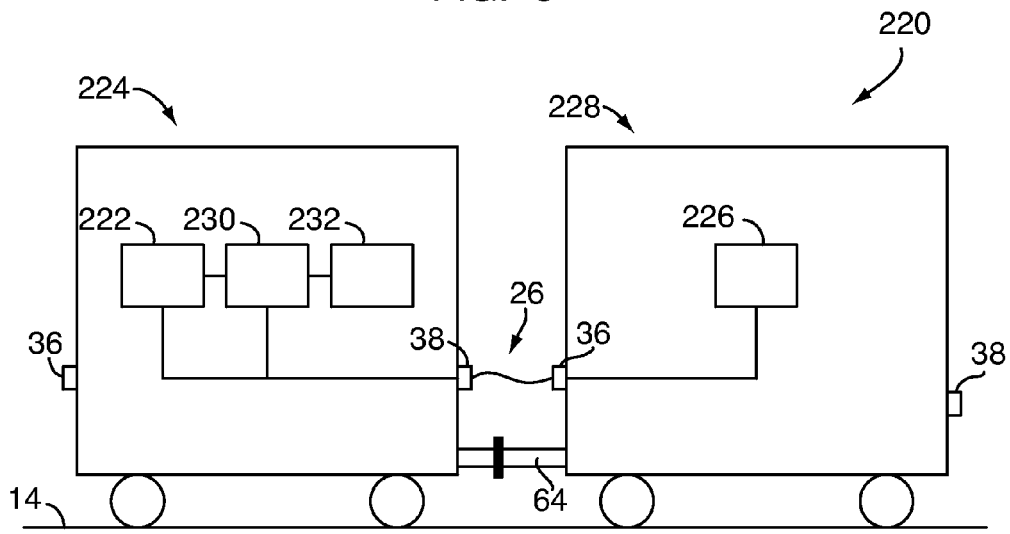
FIG. 7 is a schematic diagram of a system for managing network services among locomotives in a consist, according to an embodiment of the present invention.

As shown in FIGS. 6 and 7, embodiments of the present invention also relate to a system and method for managing network services and devices among a plurality of vehicles or locomotives in a consist. FIG. 6 illustrates an exemplary method 200 for managing network services among a plurality of networked locomotives in a consist, according to an embodiment of the present invention.

As discussed above, a locomotive consist includes a plurality of locomotives that are mechanically coupled or linked together to travel along a route and which are in communication with one another such that they function together as a single unit on a network. As further discussed above, the locomotives may be in communication with one another wirelessly, through dedicated network cables, through a locomotive multiple unit (MU) cable bus (Ethernet over MU) interconnecting adjacent locomotives in the consist, etc. In this manner, the on-board operational components of the locomotives may be linked together as a computer network such that the electronics of the lead locomotive can communicate with the electronics of the trail locomotive(s).

In an embodiment, a consist includes a plurality of locomotives, each having one or more electronic devices/operational components configured for deployment thereon. The plurality of locomotives includes a lead locomotive, as discussed above, and at least on trail locomotive. Upon joining the locomotives together in the consist, a database of services and devices available across all of the networked locomotives in the consist may be constructed, so there isn't a conflict in routing services available. In an embodiment, the database is a part of at least one operational component of the lead locomotive and is accessible by at least one of the trail locomotives. The database may also be referred to as a master service list or routing list. Additional devices or services may be registered/listed in the database as they are joined to the network, including the services and devices/operational components of the lead locomotive.

In an embodiment, the availability of operational components/devices and services may be automatically determined based on port scan or network traffic to/from that component/device, at step 202. In particular, one of the operational components on the lead locomotive, such as a controller and associated database, may orchestrate a periodic scan of available devices (and new devices) to maintain the master service and routing list, at step 204. Remote Ethernet over MU routers, for example, may be utilized to coordinate available services with the master routing network of the consist. In this respect, trail locomotives do not need to know anything about the broad consist network, IP addresses of other locomotives in the consist, etc., but instead simply maintains a list of services/devices thereon which can be communicated to the lead locomotive for compilation in the master service list.

Once the routing list/master service list is constructed, various threads of software, known as agents, can provide the information contained in the list to the devices across the consist, assist the devices in the routing of messages or provide complete failover control of message routing to trail locomotives, as discussed hereinafter. As noted above, the lead locomotive in the consist gathers and maintains the list of available services/devices and is capable of delegating services to trail locomotives in the consist.

In an embodiment, the consist also includes a failover mechanism. In particular, an operational component on the lead locomotive, such as the controller, may also determine, in addition to the services and devices available across all of the locomotives, which devices can or cannot be failed over to working devices. In an embodiment, a list of the devices that can/cannot be failed over can be constructed and maintained by the lead locomotive by any of device type, IP address range or configuration file setup.

In operation, if a particular device is designated as a device that can be failed over, then message traffic may be routed according to a routing algorithm to the same/similar device on another locomotive for processing, such as at step 206. In an embodiment, the routing algorithm may use a method, such as SNMP, to periodically scan to determine if a device is still operational. If it is, then data/messages/traffic will continue to be delivered to the device and the device will be listed with the master service list that it is available as a candidate that can receive messages/data/traffic from another locomotive. As will be readily appreciated, such an "available" status also means that the device is also available to receive another device's failover messages. For example, if a 220 MHz radio fails on the lead locomotive, the traffic may be automatically routed to a 220 MHz radio on a trailing locomotive to maintain functionality for the consist as a whole.

In connection with the system described above, at any point in time, a device on the locomotive network can request data/messages/traffic to be routed to an offboard trail locomotive. The network can coordinate that traffic so that it is routed between the locomotives, delivered, and then any response routed back again.

With certain existing systems, such as Ethernet over MU systems, any traffic that comes into the Ethernet port of the consist is sent to all the other Ethernet over MU devices, whether desired or not. In contrast to this, the present invention only routes traffic that is destined for another locomotive, instead of all traffic.

FIG. 7 is a schematic diagram of a system 220 for managing network services among locomotives in a consist. As shown therein, the system includes a first operational component 222 positioned in a first locomotive 224 in the consist, a second operational component 226 positioned in a second locomotive 228 in the consist, the first and second operational component 222,226 being at least similar in function, a monitoring device 230 configured for deployment on one of the locomotives in the consist and in communication with the first and second operational components 222,226, and further configured to determine an operational status of the first and second operational component 222,226, and a signal transmitting device 232 in communication with the first and second operational components 222,226 and configured to route traffic to one of the first operational component 222 and the second operational component 226 when the monitoring unit 230 determines that the other of the first operational component and the second operational component is in a failure state. As discussed above, in an embodiment, the monitoring unit and the signal transmitting device may be a controller or a computer.

Figure 8:
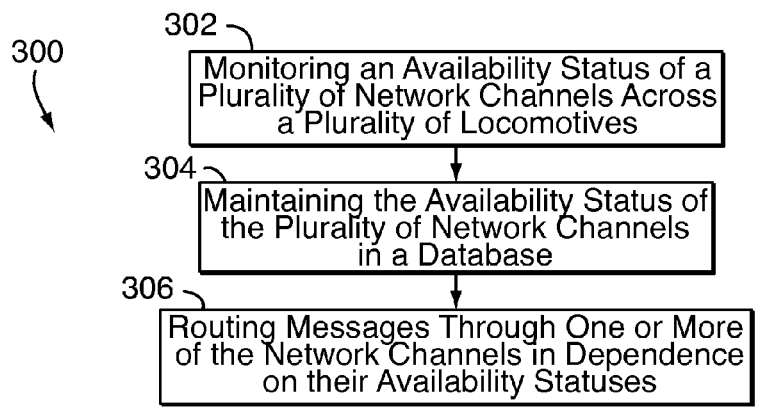
FIG. 8 is a flowchart illustrating an exemplary method for managing a high-availability network for a locomotive consist, according to an embodiment of the present invention.
Figure 9:
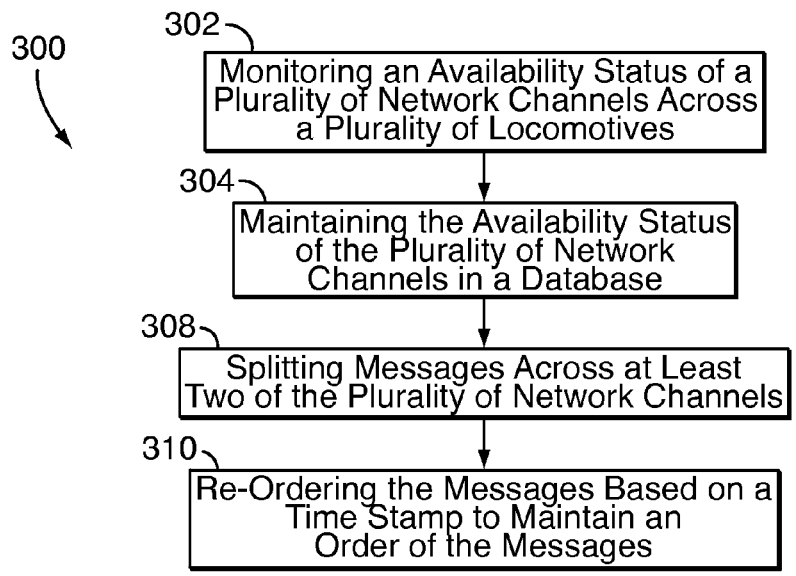
FIG. 9 is a flowchart illustrating an exemplary method for managing a high-availability network for a locomotive consist, according to another embodiment of the present invention.

Yet other embodiments of the present invention relate to a high-availability Ethernet over MU network and a method for creating and maintaining the same. FIGS. 8 and 9 illustrate exemplary methods for managing a high-availability network for a locomotive consist. In an embodiment, multiple networks are first created by any one or more of separate trainline wires, different network keys that allows traffic separation but network coordination between transmissions, and/or utilization of different encryption technologies so the networks are separate but such that there is no coordination of traffic between devices. In an embodiment, once the hardware, such as Ethernet Bridges (e.g., Ethernet over MU), for the network is established, then it is configured to use the different network keys or different encryption technologies to create the high-availability network. In another embodiment, the high-availability network may be constructed by running separate Ethernet Bridge (e.g., Ethernet over MU) lines adjacent one another.

In connection with the above, in an embodiment, the present invention relates to a method for determining which types of networks are available such that traffic can be routed to the correct locomotives in the consist. Similar to the embodiment described above, at least one electronic component monitors an availability status of the network channels of each locomotive in the consist, such as at step 302. The lead locomotive maintains a database/routing list of what networks/channels are available across each locomotive in the consist and which are not available or not working, such as at step 304, so that traffic can be routed across the consist, at step 306, to desired locomotives accordingly, as discussed hereinafter.

First, if a locomotive is present that has only one available network path, i.e. it is not redundant, then communications/traffic that are sent and received by the device on such locomotive must occur on this network path. Accordingly, because the routing list knows that the device on this locomotive only has a single available network path, this channel/path is automatically selected for any traffic to that particular locomotive/device.

In an embodiment, for locomotives that have more than one available channel/network, the traffic to devices on such locomotives, or across such locomotives, may be split across both paths, at step 308, and re-ordered at step 310 based on time stamp so that no out of order messaging occurs.

In another embodiment, the system may be configured such that messages/traffic are always sent down a designated primary path or across a primary channel, with status check messages between Ethernet over MU routing to check the integrity of a secondary pathway so that messages/traffic may be switched over to the secondary pathway with a high degree of confidence that it is actually available.

In an embodiment, management of the high-availability network involves keeping track of the communications paths/channels that are available across each locomotive in the consist, from both a configuration and operation standpoint. If a locomotive does not have a high-availability option, i.e. only a single pathway is available, then traffic will always be routed down that particular channel, as discussed above. In contrast, if a locomotive does have another pathway/channel, an operational component will periodically check for the availability of the alternate channel, as well as notify the lead locomotive routing algorithm the success or failure (availability or unavailability) of that channel. Traffic that may appear back at the source over the other channel(s) accidentally ay also be filtered out of the overall traffic that is supposed to be receive by analyzing the packets routing information.

Figure 10:
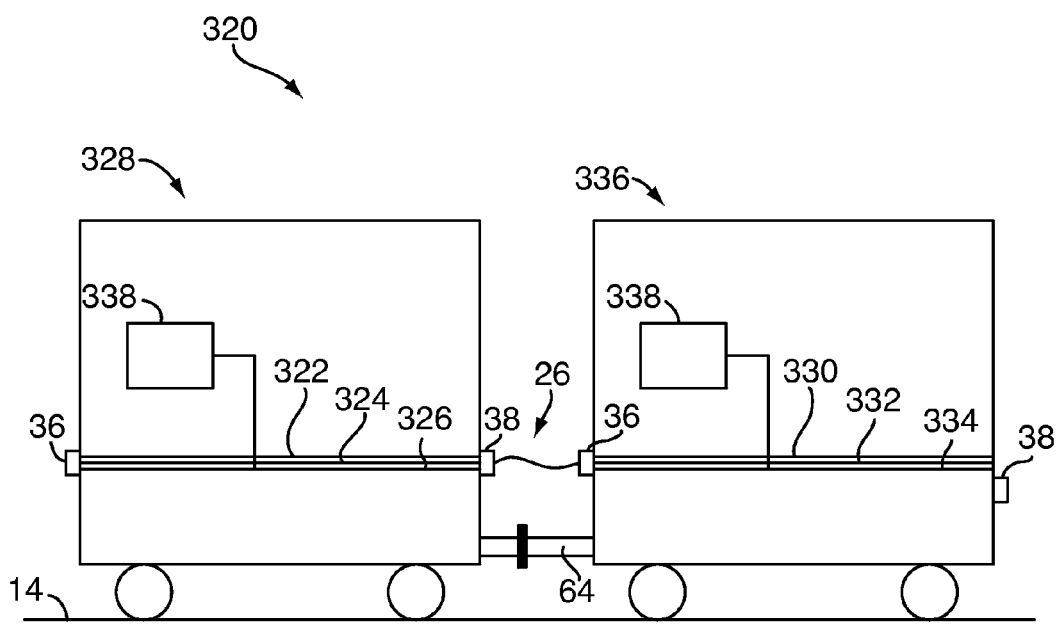
FIG. 10 is a schematic diagram of a system for managing a high-availability network for a locomotive consist, according to an embodiment of the present invention.

FIG. 10 is a schematic diagram of a system 320 for managing network services among locomotives in a consist. As shown therein, the system 320 includes a first plurality of communication channels or pathways, e.g., channels 322, 324,326, associated with a first locomotive 328, a second plurality of communication channels, e.g., channels 330,332, 334 associated with a second locomotive 336, and a routing unit 338 in communication with the first and second plurality of communication channels (322,324,326 and 330,332,334), the routing unit 338 configured for routing a message through at least one of the first plurality of communication channels 322,324,326 of the first locomotive 328 and at least one of the second plurality of channels 330,332,334 of the second locomotive 336 in dependence upon an availability status of the first and second plurality of communication channels (322, 324,326 and 330,332,334).

Figure 11:
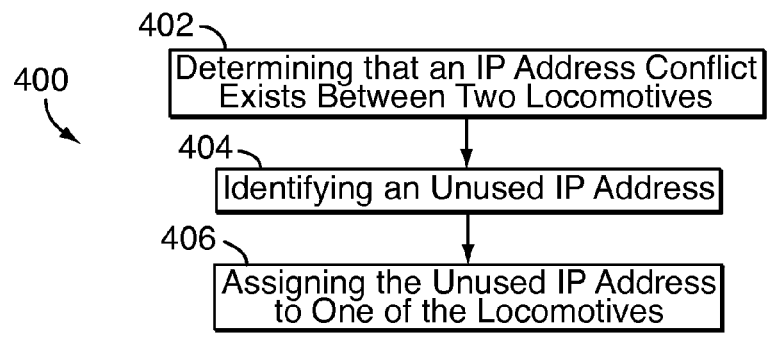
FIG. 11 is a flowchart illustrating an exemplary method for resolving a conflict between IP addresses of locomotives in a consist, in accordance with an embodiment of the present invention.
Figure 12:
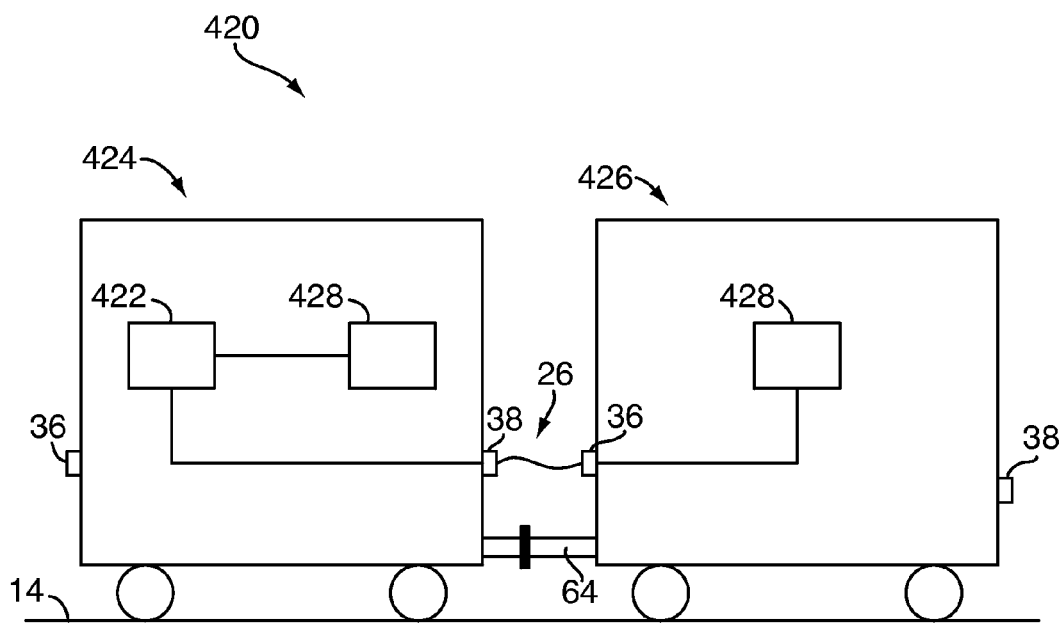
FIG. 12 is a schematic diagram of a system for resolving a conflict between IP addresses of locomotives in a consist, in accordance with an embodiment of the present invention.

As shown in FIGS. 11 and 12, other embodiments of the present invention to relate to a method and system for handling IP addressing between multiple train networks or multiple locomotives in a consist having the same IP address. As will be readily appreciated, when a locomotive is connected to another locomotive, it is possible that the locomotives will have the same IP address (static or dynamic). In order to have locomotives with the same IP address to co-exist on the same network, an IP address configuration method must be utilized to resolve the conflict.

In an embodiment, a method for configuring IP addresses for locomotives in a consist includes utilizing fixed but configurable IP addresses so that the locomotives can all be on the same WAN-type subnet. As will be readily appreciated, this will allow for communications between locomotives as long as they are routed to the same subnet. In the method, for the last octet of the IP address, a locomotive will use a MAC address entry (i.e., fixed) to translate and determine the last octet. For example, a MAC address of xx-xx-xx-xx-10 would correspond to using an IP address of xxx.xxx.xxx.16. In another embodiment, the locomotive train ID may be utilized, however, conflicts may still manifest. Accordingly, in order to resolve duplicates in train ID items, a customer number may be used.

In any event, it is possible that IP address conflicts between locomotives in a consist may still be encountered. Accordingly, the present invention also relates to a method for resolving a conflict between IP addresses of locomotives. FIG. 11 illustrates an exemplary method 400 for resolving a conflict between IP addresses of locomotives in a consist. The method includes the steps of determining that a first locomotive in the consist has an IP address that is the same as the IP address of a second locomotive in the consist (step 402), identifying an unused IP address (step 404), and assigning the unused IP address to either the first locomotive or the second locomotive (step 406). An unused IP address may be identified by listening for an unused IP address on the channel.

In another embodiment, the conflict may be resolved by using a different MAC address entry for the IP address determination in event of a conflict for the conflicting locomotives. In another embodiment, the IP address conflict may be resolved by using signal level or any other dynamic but specific factor in determining a difference between the Ethernet over MU units so it can be decided which locomotive should move to another IP address.

FIG. 12 is a schematic diagram of a system 420 for resolving a conflict between IP addresses of locomotives in a consist. As shown therein, the system includes a conflict determination module 422 configured for deployment on and/or in communication with a first locomotive 424 having a first IP address and a second locomotive 426 having a second IP address, and configured to determine that the first IP address is the same as the second IP address and a controller 428 configured for deployment on at least one of the first locomotive 404 and the second locomotive 426 and further configured for identifying an unused IP address. The controller 428 or other operational component is capable of assigning the unused IP address to one of the first locomotive 424 and the second locomotive 406. In an embodiment, the controller 428 may function as the conflict determination module 422.

An embodiment relates to a communication method for a consist comprising a plurality of vehicles. The method comprises linking the plurality of vehicles to establish a data network. For example, linking may include communicating over a communications path established between the vehicles, according to established protocols, in a manner that is designated for establishing the data network. The method further comprises designating a first vehicle of the plurality of vehicles as a network lead vehicle of the data network. The method further comprises designating a second vehicle of the plurality of vehicles as a network trail vehicle of the data network. The method further comprises communicating network data between the plurality of vehicles based at least in part on the first vehicle designated as the network lead vehicle and the second vehicle designated as the network trail vehicle.

In another embodiment, the method further comprises controlling operations of at least one of the plurality of vehicles based on the network data that is communicated.

In another embodiment, the method further comprises designating all vehicles of the plurality of vehicles other than the first vehicle as network trail vehicles and communicating the network data between the plurality of vehicles based at least in part on said all vehicles of the plurality of vehicles other than the first vehicle designated as the network trail vehicles.

In another embodiment of the method, the first vehicle is designated as the network lead vehicle based on one or more positions of one or more of the vehicles in the consist.

In another embodiment of the method, the first vehicle is designated as the network lead vehicle based on the first vehicle being a leading vehicle of the consist in a designated direction of travel of the consist.

In another embodiment of the method, the first vehicle is designated as the network lead vehicle based on a sequence of vehicles added to the consist.

In another embodiment of the method, the steps of designating the first vehicle as the network lead vehicle and designating the second vehicle as the network trail vehicle are carried out automatically subsequent to the plurality of vehicles being linked to establish the data network.

In another embodiment of the method, the step of designating the first vehicle as the network lead vehicle comprises configuring the first vehicle for operations as the network lead vehicle and communicating status information indicative of the first vehicle designated as the network lead vehicle to the second vehicle, and configuring the second vehicle for operations as the network trail vehicle.

In another embodiment, the method further comprises the first vehicle, responsive to the designation of the first vehicle as the network lead vehicle, at least one of configuring plural services available to entities in the data network or coordinating data traffic in the data network.

In another embodiment of the method, configuring the plural services comprises at least one of storing, creating, or updating at least one master routing table of the services.

In another embodiment, the method further comprises the first vehicle transitioning services between the plurality of vehicles.

In another embodiment, the method further comprises the first and second vehicles communicating setup data to one another. The first vehicle is designated as the network lead vehicle and the second is designated as the network trail vehicle based at least in part on the setup data. The step of communicating the setup data is carried out automatically subsequent to the plurality of vehicles being linked to establish the data network.

In another embodiment, the method further comprises, subsequent to a third vehicle being added to the consist: communicating setup data at least between the third vehicle and the first vehicle; and based on the setup data, either: designating the third vehicle as an additional network trail vehicle of the data network; or designating the third vehicle as the network lead vehicle in conjunction with designating the first vehicle as an additional network trail vehicle of the data network.

In an embodiment where the vehicles are rail vehicles (e.g., locomotives) in a rail vehicle consist, a communication method comprises linking the plurality of rail vehicles (e.g., locomotives) to establish a data network. The method further comprises designating a first rail vehicle (e.g., a first locomotive) of the plurality of rail vehicles (e.g., locomotives) as a network lead rail vehicle (e.g., network lead locomotive) of the data network. The method further comprises designating a second rail vehicle (e.g., a second locomotive) of the plurality of locomotives or other rail vehicles as a network trail rail vehicle (e.g., network trail locomotive) of the data network. The method further comprises communicating network data between the plurality of rail vehicles (e.g., locomotives) based at least in part on the first rail vehicle (e.g., first locomotive) designated as the network lead rail vehicle (e.g., network lead locomotive) and the second rail vehicle (e.g., second locomotive) designated as the network trail rail vehicle (e.g., network trail locomotive).

In another embodiment, the method further comprises controlling operations of at least one of the plurality of rail vehicles (e.g., locomotives) based on the network data that is communicated.

In another embodiment, the method further comprises designating all rail vehicles (e.g., locomotives) of the plurality of rail vehicles (e.g., locomotives) other than the first rail vehicle (e.g., first locomotive) as network trail rail vehicles (e.g., network trail locomotives) and communicating the network data between the plurality of rail vehicles (e.g., locomotives) based at least in part on said all rail vehicles (e.g., locomotives) of the plurality of rail vehicles (e.g., locomotives) other than the first rail vehicle (e.g., first locomotive) designated as the network trail rail vehicles (e.g., network trail locomotives).

In another embodiment of the method, the first rail vehicle (e.g., first locomotive) is designated as the network lead rail vehicle (e.g., network lead locomotive) based on one or more positions of one or more of the rail vehicles (e.g., locomotives) in the consist.

In another embodiment of the method, the first rail vehicle (e.g., first locomotive) is designated as the network lead rail vehicle (e.g., network lead locomotive) based on the first rail vehicle (e.g., first locomotive) being a leading rail vehicle (e.g., leading locomotive) of the consist in a designated direction of travel of the consist.

In another embodiment of the method, the first rail vehicle (e.g., first locomotive) is designated as the network lead rail vehicle (e.g., network lead locomotive) based on a sequence of rail vehicles (e.g., locomotives) added to the consist.

In another embodiment of the method, the steps of designating the first rail vehicle (e.g., first locomotive) as network lead rail vehicle (e.g., network lead locomotive) and designating the second rail vehicle (e.g., second locomotive) as the network trail rail vehicle (e.g., network trail locomotive) are carried out automatically subsequent to the plurality of rail vehicles (e.g., locomotives) being linked to establish the data network.

In another embodiment of the method, the step of designating the first rail vehicle (e.g., first locomotive) as the network lead rail vehicle (e.g., network lead locomotive) comprises configuring the first rail vehicle (e.g., first locomotive) for operations as the network lead rail vehicle (e.g., network lead locomotive) and communicating status information indicative of the first rail vehicle (e.g., first locomotive) designated as the network lead rail vehicle (e.g., network lead locomotive) to the second rail vehicle (e.g., second locomotive), and configuring the second rail vehicle (e.g., second locomotive) for operations as the network trail rail vehicle (e.g., network trail locomotive).

In another embodiment, the method further comprises the first rail vehicle (e.g., first locomotive), responsive to the designation of the first rail vehicle (e.g., first locomotive) as the network lead rail vehicle (e.g., network lead locomotive), at least one of configuring plural services available to entities in the data network or coordinating data traffic in the data network. In another embodiment of the method, configuring the plural services comprises at least one of storing, creating, or updating at least one master routing table of the services.

In another embodiment, the method further comprises the first rail vehicle (e.g., first locomotive) controlling transitioning services between the plurality of rail vehicles (e.g., locomotives).

In another embodiment, the method further comprises the first and second rail vehicles (e.g., first and second locomotives) communicating setup data to one another. The first rail vehicle (e.g., first locomotive) is designated as the network lead rail vehicle (e.g., network lead locomotive) and the second is designated as the network trail rail vehicle (e.g., network trail locomotive) based at least in part on the setup data. The step of communicating the setup data is carried out automatically subsequent to the plurality of rail vehicles (e.g., locomotives) being linked to establish the data network.

In another embodiment, the method further comprises, subsequent to a third locomotive or other rail vehicle being added to the consist: communicating setup data at least between the third locomotive (or other rail vehicle) and the first rail vehicle (e.g., first locomotive); and based on the setup data, either: designating the third locomotive (or other rail vehicle) as an additional network trail rail vehicle (e.g., additional network trail locomotive) of the data network; or designating the third locomotive (or other rail vehicle) as the network lead rail vehicle (e.g., network lead locomotive) in conjunction with designating the first rail vehicle (e.g., first locomotive) as an additional network trail rail vehicle (e.g., additional network trail locomotive) of the data network.

Another embodiment relates to a communication system (e.g., for a vehicle consist) comprising a first controller unit configured for operative coupling in a first vehicle. The first controller unit is configured, when the first vehicle is linked with one or more second vehicles in a data network of a consist, to designate one of the first vehicle or one of the one or more second vehicles as a network lead vehicle of the data network and to designate all other vehicles in the consist as network trail vehicles of the data network. The first controller unit is further configured to control communications of network data between the first vehicle and the one or more second vehicles based at least in part on the network lead vehicle and network trail vehicle designations.

In another embodiment of the communication system, the first controller unit is configured to designate the network lead vehicle and the network trail vehicles according to at least one parameter of the consist. The at least one parameter comprises one or more of a position of the first vehicle relative to the one or more second vehicles in the consist, a sequence of vehicles added to the consist, or an identification of which vehicle in the consist is a leading vehicle of the consist in a designated direction of travel.

In another embodiment of the communication system, the first controller unit is configured to automatically control communication of setup data between the first vehicle and the one or more second vehicles subsequent to establishment of the data network in the consist. The first controller unit is configured to designate the network lead vehicle and the network trail vehicles based at least in part on the setup data. In another embodiment of the communication system, the first controller unit is configured to designate the network lead vehicle and the network trail vehicles according to at least one parameter of the consist. Further, information of the parameter is included in the setup data, and the at least one parameter comprises one or more of a position of the first vehicle relative to the one or more second vehicles in the consist, a sequence of vehicles added to the consist, or an identification of which vehicle in the consist is a leading vehicle of the consist in a designated direction of travel.

In another embodiment of the communication system, the first controller is configured, when the first vehicle is designated as the network lead vehicle, to at least one of configure plural services available to entities in the data network or coordinate data traffic in the data network.

Another embodiment relates to a communication system (e.g., for a train or other rail vehicle consist) comprising a first controller unit configured for operative coupling in a first rail vehicle (e.g., a first locomotive). The first controller unit is configured, when the first rail vehicle (e.g., first locomotive) is linked with one or more second rail vehicles (e.g., one or more second locomotives) in a data network of a consist, to designate one of the first rail vehicle (e.g., first locomotive) or one of the one or more second rail vehicles (e.g., one of the one or more second locomotives) as a network lead rail vehicle (e.g., network lead locomotive) of the data network and to designate all other rail vehicles (e.g., locomotives) in the consist as network trail rail vehicles (e.g., network trail locomotives) of the data network. The first controller unit is further configured to control communications of network data between the first rail vehicle (e.g., first locomotive) and the one or more second rail vehicles (e.g., one or more second locomotives) based at least in part on the network lead rail vehicle (e.g., network lead locomotive) and network trail rail vehicle (e.g., network trail locomotive) designations.

In another embodiment of the communication system, the first controller unit is configured to designate the network lead rail vehicle (e.g., network lead locomotive) and the network trail rail vehicles (e.g., network trail locomotives) according to at least one parameter of the consist. The at least one parameter comprises one or more of a position of the first rail vehicle (e.g., first locomotive) relative to the one or more second rail vehicles (e.g., one or more second locomotives) in the consist, a sequence of rail vehicles (e.g., locomotives) added to the consist, or an identification of which locomotive or other rail vehicle in the consist is a leading locomotive or other rail vehicle of the consist in a designated direction of travel.

In another embodiment of the communication system, the first controller unit is configured to automatically control communication of setup data between the first rail vehicle (e.g., first locomotive) and the one or more second rail vehicles (e.g., one or more second locomotives) subsequent to establishment of the data network in the consist. The first controller unit is configured to designate the network lead rail vehicle (e.g., network lead locomotive) and the network trail rail vehicles (e.g., network trail locomotives) based at least in part on the setup data. In another embodiment of the communication system, the first controller unit is configured to designate the network lead rail vehicle (e.g., network lead locomotive) and the network trail rail vehicles (e.g., network trail locomotives) according to at least one parameter of the consist. Further, information of the parameter is included in the setup data, and the at least one parameter comprises one or more of a position of the first rail vehicle (e.g., first locomotive) relative to the one or more second rail vehicles (e.g., one or more second locomotives) in the consist, a sequence of rail vehicles (e.g., locomotives) added to the consist, or an identification of which locomotive or other rail vehicle in the consist is a leading locomotive or other rail vehicle of the consist in a designated direction of travel.

In another embodiment of the communication system, the first controller is configured, when the first rail vehicle (e.g., first locomotive) is designated as the network lead rail vehicle (e.g., network lead locomotive), to at least one of configure plural services available to entities in the data network or coordinate data traffic in the data network.

In another embodiment of a communication system, the communication system comprises a first controller unit configured for operative coupling in a first vehicle. The first controller unit is configured, when the first vehicle is linked with one or more second vehicles in a data network of a consist, to enter a first designated mode of operation responsive to communications between the first vehicle and the one or more second vehicles for selecting the first vehicle to operate in the first designated mode of operation and the one or more second vehicles to operate in a different, second designated mode of operation. The first controller unit is further configured, when in the first designated mode of operation, to at least one of: coordinate data traffic in the data network of the consist; and/or configure and manage services available to plural entities of the data network of the consist.

In another embodiment of a communication system, the communication system comprises a first controller unit configured for operative coupling in a first locomotive or other first rail vehicle. The first controller unit is configured, when the first locomotive (or other first rail vehicle) is linked with one or more second vehicles (e.g., one or more second locomotives) in a data network of a consist, to enter a first designated mode of operation responsive to communications between the first locomotive (or other first rail vehicle) and the one or more second rail vehicles (e.g., one or more second locomotives) for selecting the first rail vehicle (e.g., first locomotive) to operate in the first designated mode of operation and the one or more second rail vehicles (e.g., one or more second locomotives) to operate in a different, second designated mode of operation. The first controller unit is further configured, when in the first designated mode of operation, to at least one of: coordinate data traffic in the data network of the consist; and/or configure and manage services available to plural entities of the data network of the consist.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the invention, including the best mode, and also to enable any person skilled in the art to practice the embodiments of invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present invention will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A communication method for a consist comprising a plurality of locomotives, the method comprising:
    linking the plurality of locomotives to establish a data network;
    designating a first locomotive of the plurality of locomotives as a network lead locomotive of the data network;
    designating a second locomotive of the plurality of locomotives as a network trail locomotive of the data network;
    communicating network data between the plurality of locomotives based at least in part on the first locomotive designated as the network lead locomotive and the second locomotive designated as the network trail locomotive;
    responsive to the designation of the first locomotive as the network lead locomotive, configuring plural services available to entities in the data network by creating and storing at least one master routing table of services; and
    updating the master routing table of services by periodically scanning the data network for available services.

2. The method of claim 1, further comprising controlling operations of at least one of the plurality of locomotives based on the network data that is communicated.

3. The method of claim 1, further comprising designating all locomotives of the plurality of locomotives other than the first locomotive as network trail locomotives and communicating the network data between the plurality of locomotives based at least in part on said all locomotives of the plurality of locomotives other than the first locomotive designated as the network trail locomotives.

4. The method of claim 1, wherein the first locomotive is designated as the network lead locomotive based on one or more positions of one or more of the locomotives in the consist.

5. The method of claim 1, wherein the first locomotive is designated as the network lead locomotive based on the first locomotive being a leading locomotive of the consist in a designated direction of travel of the consist.

6. The method of claim 1, wherein the first locomotive is designated as the network lead locomotive based on a sequence of locomotives added to the consist.

7. The method of claim 1, wherein the steps of designating the first locomotive as the network lead locomotive and designating the second locomotive as the network trail locomotive are carried out automatically subsequent to the plurality of locomotives being linked to establish the data network.

8. The method of claim 7, wherein the step of designating the first locomotive as the network lead locomotive comprises configuring the first locomotive for operations as the network lead locomotive and communicating status information indicative of the first locomotive designated as the network lead locomotive to the second locomotive, and configuring the second locomotive for operations as the network trail locomotive.

9. The method of claim 1, further comprising the first locomotive, responsive to the designation of the first locomotive as the network lead locomotive, coordinating data traffic in the data network.

10. The method of claim 9, further comprising the first locomotive transitioning services between the plurality of locomotives.

11. The method of claim 1, further comprising the first and second locomotives communicating setup data to one another, wherein the first locomotive is designated as the network lead locomotive and the second is designated as the network trail locomotive based at least in part on the setup data, and wherein the step of communicating the setup data is carried out automatically subsequent to the plurality of locomotives being linked to establish the data network.

12. The method of claim 1, further comprising, subsequent to a third locomotive being added to the consist:
    communicating setup data at least between the third locomotive and the first locomotive; and
    based on the setup data, either: designating the third locomotive as an additional network trail locomotive of the data network; or designating the third locomotive as the network lead locomotive in conjunction with designating the first locomotive as an additional network trail locomotive of the data network.

13. A communication method for a consist comprising a plurality of vehicles, the method comprising:
    linking the plurality of vehicles to establish a data network;
    designating a first vehicle of the plurality of vehicles as a network lead vehicle of the data network;
    designating a second vehicle of the plurality of vehicles as a network trail vehicle of the data network;
    communicating network data between the plurality of vehicles based at least in part on the first vehicle designated as the network lead vehicle and the second vehicle designated as the network trail vehicle;
    configuring plural services available to entities in the data network by creating and storing at least one master routing table of services provided by a plurality of devices on board the vehicles; and
    determining which of said devices can be failed over to other of said devices.

14. A communication system comprising:
    a first controller unit configured for operative coupling in a first locomotive;
    wherein the first controller unit is configured, when the first locomotive is linked with one or more second locomotives in a data network of a consist, to designate one of the first locomotive or one of the one or more second locomotives as a network lead locomotive of the data network and to designate all other locomotives in the consist as network trail locomotives of the data network;
    wherein the first controller unit is configured to control communications of network data between the first locomotive and the one or more second locomotives based at least in part on the network lead locomotive and network trail locomotive designations; and wherein the first controller is configured to designate the network lead locomotive and the network trail locomotives after the consist beings moving according to at least one parameter of the consist, the at least one parameter including a direction of movement of the consist.

15. The communication system of claim 14, wherein the at least one parameter further includes one or more of a position of the first locomotive relative to the one or more second locomotives in the consist and a sequence of locomotives added to the consist.

16. The communication system of claim 14, wherein the first controller unit is configured to automatically control communication of setup data between the first locomotive and the one or more second locomotives subsequent to establishment of the data network in the consist, and wherein the first controller unit is configured to designate the network lead locomotive and the network trail locomotives based at least in part on the setup data.

17. The communication system of claim 16, wherein:
the first controller unit is configured to designate the network lead locomotive and the network trail locomotives according to at least one parameter of the consist;
information of the parameter is included in the setup data; and
the at least one parameter comprises one or more of a position of the first locomotive relative to the one or more second locomotives in the consist, a sequence of locomotives added to the consist, or an identification of which locomotive in the consist is a leading locomotive of the consist in a designated direction of travel.

18. The communication system of claim 14, wherein the first controller is configured, when the first locomotive is designated as the network lead locomotive, to at least one of: configure plural services available to entities in the data network or coordinate data traffic in the data network.

19. The communication system of claim 14, wherein the at least one parameter further includes one or more of GPS information including direction and speed of travel of the consist, wheel speed information received by the first controller unit, engineer handle direction information received by the first controller unit, and switch settings for lead and trail locomotive headlight configuration.

20. A communication system comprising:
a first controller unit configured for operative coupling in a first locomotive;
wherein the first controller unit is configured, when the first locomotive is linked with one or more second locomotives in a data network of a consist, to enter a first designated mode of operation responsive to communications between the first locomotive and the one or more second locomotives for selecting the first locomotive to operate in the first designated mode of operation and the one or more second locomotives to operate in a different, second designated mode of operation;
wherein the first controller unit is configured, when in the first designated mode of operation, to at least one of: coordinate data traffic in the data network of the consist; or configure and manage services available to plural entities of the data network of the consist; and
wherein the first controller unit is configured, when in the first designated mode of operation, to transition a service provided by a first entity of the data network to a second entity of the data network in response to a determination that the service provided by the first entity is unavailable.

\* \* \* \* \*

UNITED STATES PATENT AND TRADEMARK OFFICE
CERTIFICATE OF CORRECTION

PATENT NO. : 8,620,553 B2
APPLICATION NO. : 13/489738
DATED : December 31, 2013
INVENTOR(S) : Kraeling et al.

It is certified that error appears in the above-identified patent and that said Letters Patent is hereby corrected as shown below:

In the Specification:

In Column 7, Line 17, delete "MU port 28" and insert -- MU port 38 --, therefor.

In Column 14, Line 22, delete "ay" and insert -- may --, therefor.

In the Claims:

In Column 22, Line 21, in Claim 11, delete "second" and insert -- second locomotive --, therefor.

Signed and Sealed this
Third Day of June, 2014

Michelle K. Lee
*Deputy Director of the United States Patent and Trademark Office*